(12) United States Patent
Eriksson

(10) Patent No.: US 10,054,003 B2
(45) Date of Patent: Aug. 21, 2018

(54) TURBINE SYSTEM

(71) Applicant: VOLVO TRUCK CORPORATION, Göteborg (SE)

(72) Inventor: Pontus Eriksson, Helsingborg (SE)

(73) Assignee: Volvo Truck Corporation, Göteborg (SE)

( * ) Notice: Subject to any disclaimer, the term of this patent is extended or adjusted under 35 U.S.C. 154(b) by 16 days.

(21) Appl. No.: 15/317,168

(22) PCT Filed: Jun. 10, 2014

(86) PCT No.: PCT/EP2014/001565
§ 371 (c)(1),
(2) Date: Dec. 8, 2016

(87) PCT Pub. No.: WO2015/188842
PCT Pub. Date: Dec. 17, 2015

(65) Prior Publication Data
US 2018/0038240 A1    Feb. 8, 2018

(51) Int. Cl.
| F01D 17/14 | (2006.01) |
| F02B 37/18 | (2006.01) |
| F01D 17/10 | (2006.01) |
| F02B 37/00 | (2006.01) |
| F02B 41/10 | (2006.01) |

(52) U.S. Cl.
CPC ......... *F01D 17/143* (2013.01); *F01D 17/105* (2013.01); *F02B 37/004* (2013.01); *F02B 37/183* (2013.01); *F02B 41/10* (2013.01); *F05D 2220/40* (2013.01)

(58) Field of Classification Search
CPC .... F01D 17/143; F01D 17/105; F02B 37/183; F02B 37/004; F02B 41/10; F05D 2220/40
USPC ............................................. 60/605.1, 605.2
See application file for complete search history.

(56) References Cited

U.S. PATENT DOCUMENTS

| 4,344,289 A * | 8/1982 | Curiel | F02B 37/013 |
| | | | 417/407 |
| 8,424,305 B2 * | 4/2013 | Sundin | F01D 5/048 |
| | | | 415/199.2 |

(Continued)

FOREIGN PATENT DOCUMENTS

| DE | 4221734 A1 | 1/1994 |
| DE | 102004061030 A1 | 6/2006 |
| EP | 1519017 A1 | 3/2005 |

(Continued)

OTHER PUBLICATIONS

International Search Report (dated Sep. 12, 2014) for corresponding International App. PCT/EP2014/001565.

(Continued)

*Primary Examiner* — Hoang Nguyen
(74) *Attorney, Agent, or Firm* — WRB-IP LLP

(57) ABSTRACT

A turbine system for recovering energy of exhaust gases of an internal combustion engine is provided. The turbine system includes a first turbine device, a second turbine device, and a flow control valve for bypassing exhaust gases passed the second turbine device. The turbine system further includes a pneumatic valve arranged between the first turbine device and the second turbine device and being configured to control the flow of exhaust gas to the second turbine device.

18 Claims, 5 Drawing Sheets

(56) References Cited

U.S. PATENT DOCUMENTS

2006/0021347 A1* 2/2006 Sun ................ F02B 37/013
                                                    60/612
2016/0376021 A1* 12/2016 Ullyott ............... F01C 21/06
                                                    60/783

FOREIGN PATENT DOCUMENTS

| GB | 2429262 A | 2/2007 |
| WO | 2007061339 A1 | 5/2007 |
| WO | 2012145000 A1 | 10/2012 |

OTHER PUBLICATIONS

International Preliminary Report on Patentability (dated Sep. 14, 2016) for corresponding International App. PCT/EP2014/001565.

* cited by examiner

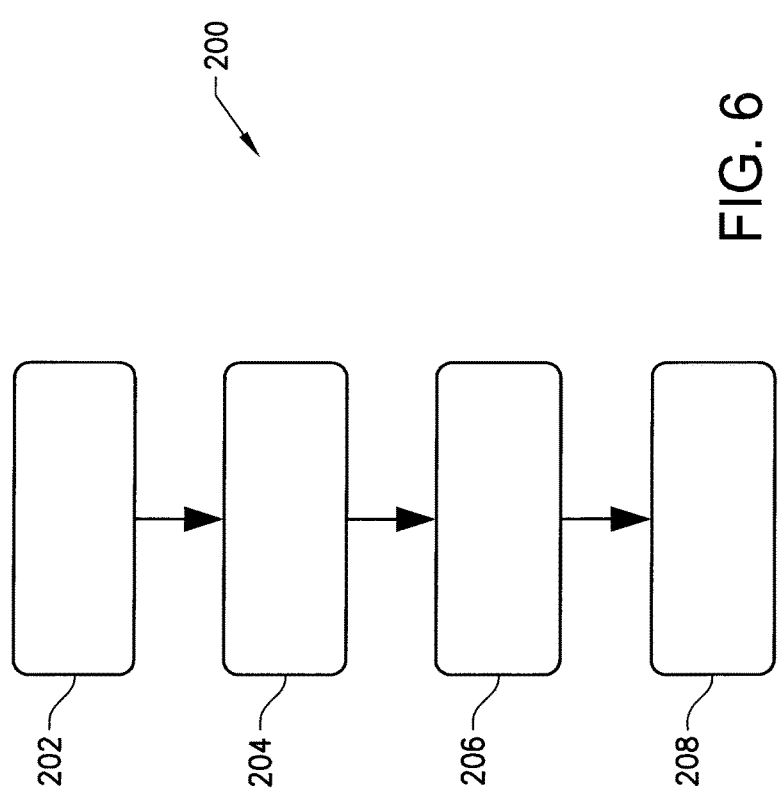

TURBINE SYSTEM

BACKGROUND AND SUMMARY

The invention relates to a turbine system for recovering energy of exhaust gases of an internal combustion engine. More particularly the present invention relates to improvements of such turbine systems.

The invention can be applied in heavy-duty vehicles, such as trucks, buses and construction equipment. Although the invention will be described with respect to a truck, the invention is not restricted to this particular vehicle, but may also be used in other applications utilizing turbine systems such as aero or marine systems.

Vehicles may be provided with turbine systems for recovering energy of the exhaust gas flow from an internal combustion engine. A turbine system may e.g. include a turbocharger which purpose is to convert the energy of the exhaust gas into a pressure increase of the intake air to the internal combustion engine, and a turbocompound unit which purpose is to convert the remaining energy into a rotational movement of a shaft. The rotational movement of the shaft is transferred as a torque increase to the crankshaft of the engine of the vehicle. Other known turbine systems include two turbochargers arranged in series such that the intake air is compressed in two stages, an initial compression by means of one of the turbochargers, and a final compression by means of the second turbocharger.

The use of turbine systems has proven to provide significant advantages on driving economics as well as on the environment; the energy recovery from the exhaust gas flow will in fact reduce the fuel consumption of the vehicle.

U.S. Pat. No. 5,119,633 describes an internal combustion engine and a turbine system having a turbocharger arranged in series with a downstream turbocompound device. A bypass channel is provided which can be opened or closed by means of a moveable shroud; in a closed position all of the exhaust gas flows through the turbocompound unit, while in an open position most of the exhaust gas bypasses the turbocompound unit.

The turbocompound device of the above-described system will produce a torque increase to the crankshaft which is not always desirable. Furthermore it is not possible to restrict the flow of exhaust gas through the turbine for engine braking. Therefore, there is a need for an improved turbine system.

It is desirable to provide a turbine system/method, which creates conditions for an improved efficiency, at least in some operational conditions.

By the provision of a flow control valve for bypassing exhaust gases passed the second turbine device and a pneumatic valve between the first and second turbine devices, it is possible to shut off the flow to the second turbine device substantially, whereby back pressure may be accurately controlled by regulating the flow control valve of the bypass channel.

Preferably the pneumatic valve is an on/off valve. This is advantageous in that the pneumatic valve is operated in a robust manner since the pneumatic valve, when otherwise controlled variable thus allowing for intermediate positions between an open position and a closed position, may give rise to oscillations.

The turbine system may comprise a controller being connected to the flow control valve and to the on/off valve for regulating the valves. Back pressure and bypass amount is thereby controlled in a very efficient manner.

The controller may in some embodiments be configured to regulate the on/off valve in either a fully open position or in a closed position, thus reducing the risk for oscillations effectively.

The on/off valve may be an exhaust gas pressure regulator forming part of a diffuser for the exhaust gas flowing through the turbine system. The on/off valve is thereby implemented as an existing component in the exhaust gas flow path whereby the additional space required for such construction is greatly reduced.

The flow control valve is preferably continuously variable between two end positions. When the on/off valve is closed it is thereby possible to accurately control the back pressure, as well as the bypass amount, according to desired operating parameters.

The flow control valve may comprise a moving member which in a first end position is closing a bypass channel formed by said moving member, and which in a second end position is opening said bypass channel. The moving member may further be configured to move in a linear direction. The moving member may form part of a sliding wall, and the sliding wall may surround the on/off valve such that the bypass channel forms an annular channel radially outside the on/off valve. The flow control valve may consequently be provided in a robust manner, whereby the annular symmetric shape allows for efficient packaging and good aerodynamics.

The bypass channel may extend from an outlet of the first turbine device to an outlet of the second turbine device such that no or very little amount of exhaust gas will be allowed to enter the inlet of the second turbine device when the on/off valve is closed.

The turbine system may further comprise a bypass pipe, and the flow control valve may be arranged inside the bypass pipe for regulating the flow through the bypass pipe. The bypass pipe may extend from an outlet of the first turbine device to an outlet of the second turbine device. The bypass pipe may thus extend outside an exhaust gas flow path connecting the first and second turbine devices, which is advantageous in that very little modifications need to be made of existing turbine devices.

The first turbine device may be a turbocharger device, and the second turbine device may be a turbocharger device or a turbocompound device arranged in series with the first turbine device.

According to another aspect, a vehicle comprising a turbine system according to the first aspect is provided.

A method for controlling a turbine system configured to recover energy of exhaust gases of an internal combustion engine is also provided. The turbine system comprises a first turbine device, a second turbine device, a flow control valve for bypassing the second turbine device, and a pneumatic valve arranged between the first turbine device and the second turbine device. The method further comprises the steps of determining if the pneumatic valve should be in a fully open position or in a closed position resulting in a desired position of the pneumatic valve, controlling the position of the pneumatic valve in accordance with its desired position, determining if the flow control valve should be in a fully open position, a semi-open position, or in a closed position resulting in a desired position of the flow control valve, and controlling the position of the flow control valve in accordance with its desired position.

The step of controlling the position of the pneumatic valve according to a fully open position may comprise arranging the pneumatic valve in an end position, and the step of controlling the position of the pneumatic valve according to a closed position may comprise arranging the pneumatic valve in an opposite end position.

According to a further aspect, a computer program is provided comprising program code means for performing the steps of the above-mentioned method when said program is run on a computer.

According to a yet further aspect a computer readable medium carrying a computer program is provided comprising program code means for performing the steps of the above-mentioned method when said program product is run on a computer.

A control unit is also provided for controlling the operation of a turbine system, the control unit being configured to perform the steps of the above-mentioned method.

BRIEF DESCRIPTION OF THE DRAWINGS

With reference to the appended drawings, below follows a more detailed description of embodiments of the invention cited as examples.

In the drawings:

FIG. 6 is a schematic view of a method according to an embodiment.

DETAILED DESCRIPTION OF EXAMPLE EMBODIMENTS OF THE INVENTION

Figure 1:
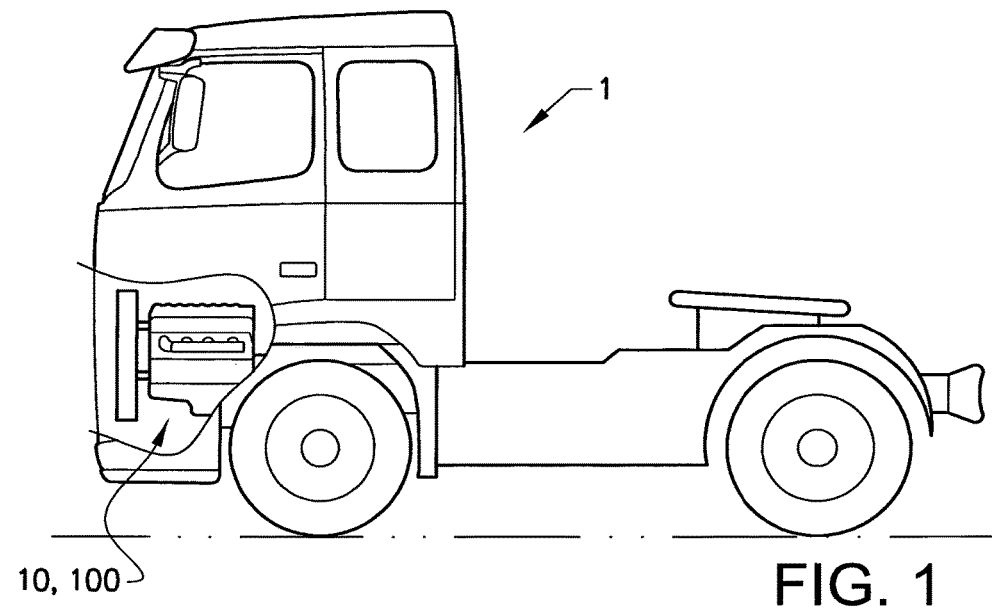
FIG. 1 is a side view of a vehicle according to an embodiment.

Starting with FIG. 1 a vehicle 1 is shown. The vehicle 1, which is illustrated as a truck, has an internal combustion engine 10 for driving the vehicle 1. As will be further explained below the internal combustion engine 0 of the vehicle 1 is provided with a turbine system 100 according to various embodiments. The vehicle 1 may have additional propulsion units, such as electric drives etc. as long as it has at least one engine providing a flow of exhaust gases interacting with the turbine system 100. Hence the vehicle 1 is not exclusively a truck but may also represent various heavy duty vehicles such as buses, constructional equipment, etc.

Figure 2:
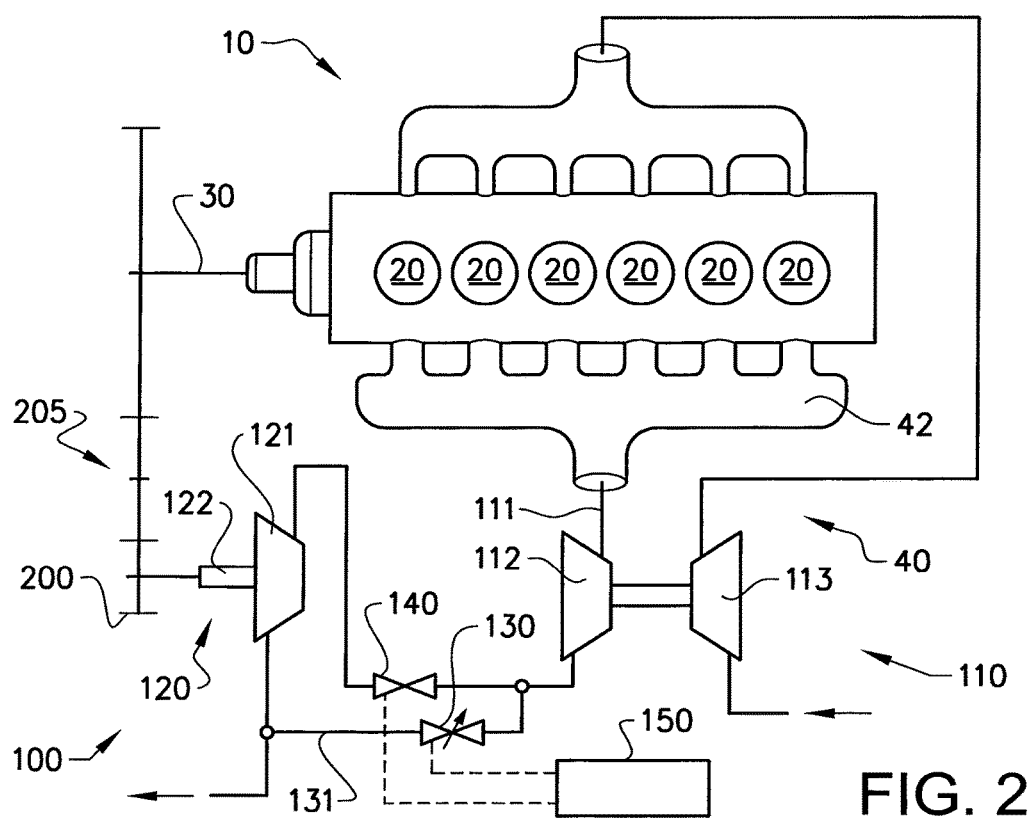
FIG. 2 is a schematic view of an internal combustion engine according to an embodiment.

In FIG. 2 an example of an internal combustion engine 10 is shown. The internal combustion engine 10 includes a plurality of cylinders 20 operated to combust fuel, such as diesel or gasoline, whereby the motion of pistons reciprocating in the cylinders 20 is transmitted to a rotation movement of a crank shaft 30. The crank shaft 30 is further coupled to a transmission (not shown) for providing a torque to driving elements (not shown). In case of a heavy vehicle, such as a truck, the driving elements are wheels; however the internal combustion engine 10 may also be used for other equipment such as construction equipment, marine applications, etc. and to drive auxiliary equipment such as compressors and pumps.

The internal combustion engine 10 further comprises an exhaust gas system 40, which system 40 serves the purpose of recovering at least some of the energy in the exhaust gas flow to improve the performance of the internal combustion engine 10. In the shown example the exhaust gas exits the cylinders 20 and enters a manifold 42 which is further connected to the turbine system 100. The turbine system 100 comprises a first turbine device 110 and a second turbine device 120. The exhaust gas flows into an inlet 111 of the first turbine device 110, which in this particular embodiment is illustrated as a turbocharger. The exhaust gas flow causes a turbine wheel 112 to rotate, which rotation is translated to a corresponding rotation of a compressor wheel 113 being used to compress intake air before it is introduced in the cylinders 20. The structural as well as functional specifications of a turbocharger are well known in the art and will not be described in further details.

The exhaust gas exits the first turbine device 110 and flows to a second turbine device 120, which in this particular embodiment is illustrated as a turbocompound unit. As is further shown in FIG. 2 the exhaust gas flows to the second turbine device 120 via an on/off valve 140 acting as an exhaust gas pressure regulator. The incoming exhaust gas, from which some energy have already been used to drive the turbine wheel 112 of the turbo charger 110, is guided to pass a turbine wheel 121 of the turbocompound unit 120, thus causing the turbine wheel 121 and an associated turbine shaft 122 to rotate. The rotation of the turbine shaft 122 is transmitted to a corresponding rotation of a gear wheel 200 meshing with further gearings 205 in order to couple the turbine shaft 122 to a crankshaft 30. Hence, when the turbine wheel 21 is forced to rotate the turbine shaft 122 will provide an additional torque to the crankshaft 30.

The turbine system 100 further comprises a flow control valve 130 which is arranged between the first and second turbine devices 110, 120, and forms part of a bypass channel 131 that connects the outlet of the first turbine device 110 with the outlet of the second turbine device 120. FIG. 2 also shows a controller 150 being connected with the on/off valve 140 and the flow control valve 130 for regulating the valves 130, 140 according to specific preferences. During driving of a vehicle 1 having a turbine system 100 different situations will occurs for which control of the valves 130, 140 will provide improved conditions. For example, acceleration of the turbine 112 of the first turbine device 110 is increased if the bypass valve 130 is opened; during braking of the vehicle closing the on/off valve 140 and controlled opening of the bypass valve 130 will prevent torque addition to the crankshaft 30, etc.

Figure 3:
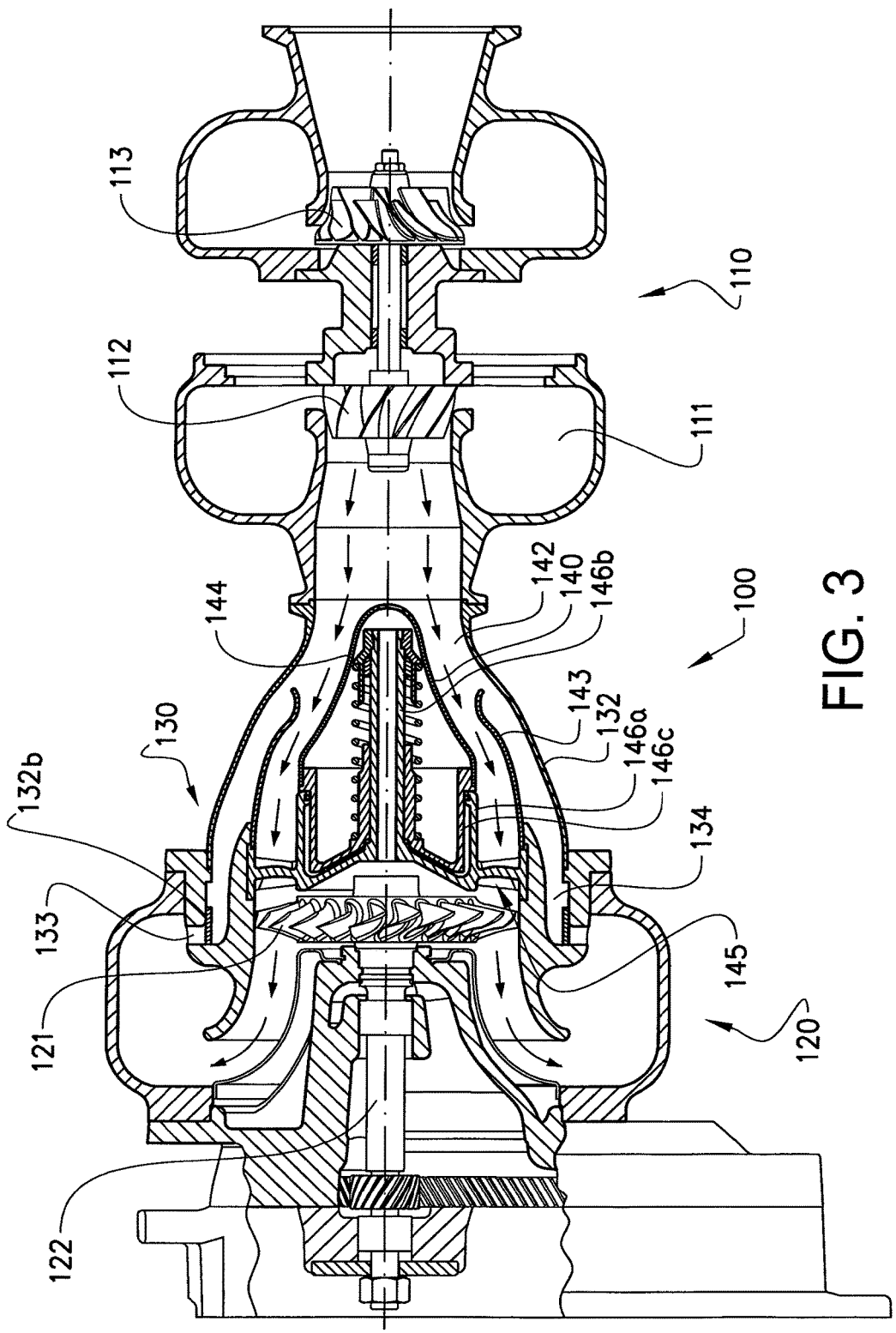
FIG. 3 is a cross-sectional view of a turbine system according to an embodiment.
Figure 4:
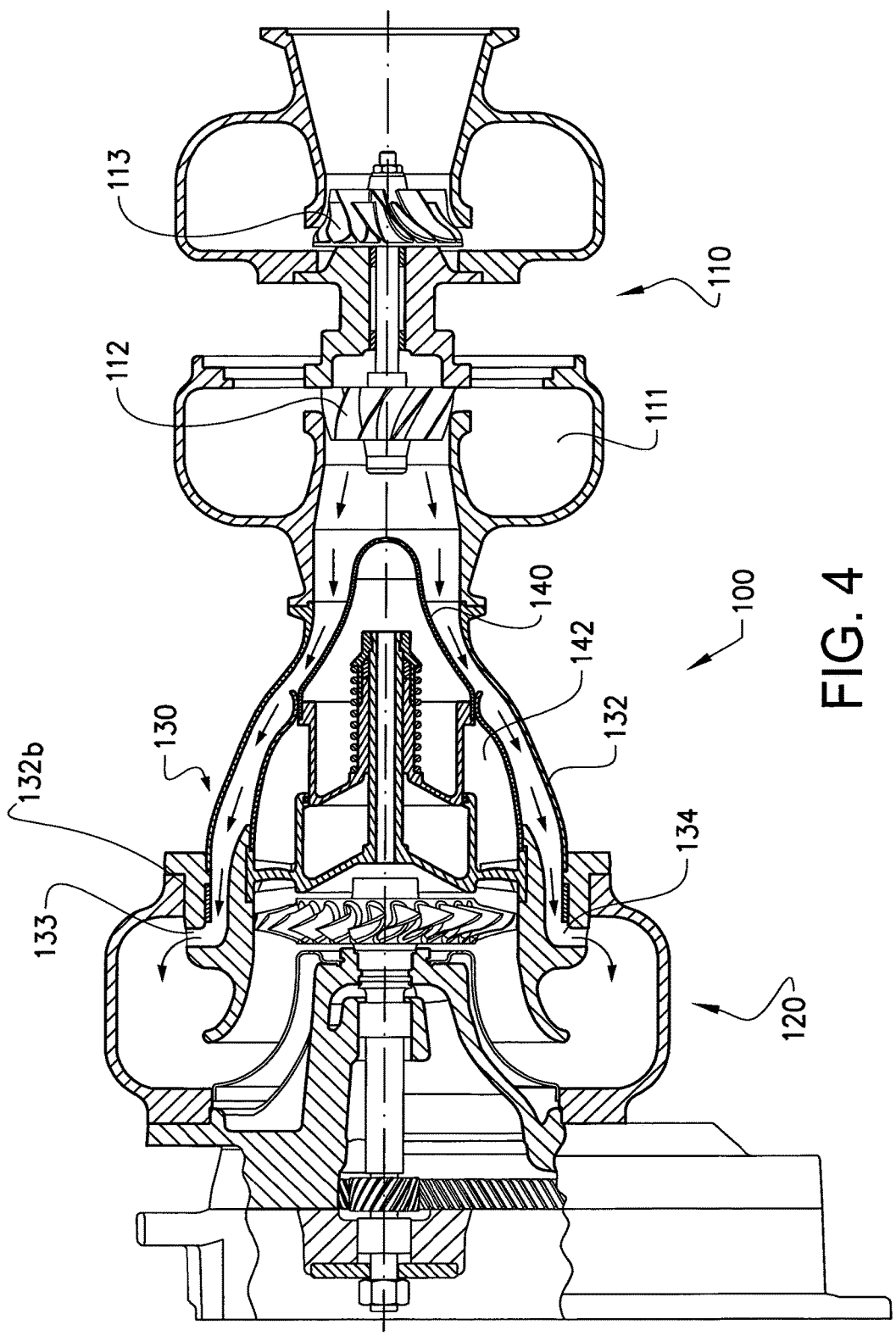
FIG. 4 is a cross-sectional view of the turbine system shown in FIG. 3 although operated in another position.

An embodiment of a turbine system 100 is shown in further details in FIGS. 3 and 4, illustrating different operational modes of the valves 130, 140. The turbine system 100 comprises a first turbine device 10 in the form of a turbocharger, and a second turbine device 120 in the form of a turbocompound device arranged downstream the 5 turbocharger. However, other embodiments of a turbine system 100 do not include such provision of the turbocompound unit, but instead the second turbine device 120 is implemented as a secondary, or low pressure turbocharger.

The on/off valve 140 is implemented as a pneumatically controlled exhaust gas pressure 10 regulator 140 which is arranged in a flow path 142 for the exhaust gas. The exhaust gas flow path 142 forms an annular conduit which has an outer periphery being defined by an exhaust gas duct 143, and an inner periphery being defined by a regulating member 144 which is arranged inside the exhaust gas duct 143. The valve 140 is controllable for adjusting the amount of exhaust gas flowing through. During normal operation the valve 15 140 is in its idle position whereby no restriction in the exhaust gas flow is provided. This position is shown in FIG. 3. However, in some situations it is desirable to restrict flow through the engine and to compress the exhaust gas in the cylinders, e.g. during braking or engine heat mode for increasing the temperature of the exhaust gas. If this is the case the exhaust gas pressure regulator 140 changes its position into an operational position 0 for blocking the exhaust gas flow, which position is shown in FIG. 4.

The regulating member 144 may have a conical shape, or a shape slightly deviating from a strict conical shape as indicated in FIGS. 3-4 in which a bell shape is presented. Correspondingly, the exhaust gas duct 143 may have a conical shape, or a shape slightly deviating from a strict conical shape as indicated in FIGS. 3-4, in which a semi dome shape is presented.

As the diameter of the exhaust gas duct 143 and the diameter of the regulating member 144 are increasing along the exhaust gas flow direction, the cross-sectional area of the 0 flow path 142 will increase along the exhaust gas flow direction whereby a diffusion of the exhaust gas will be provided.

The valve 140 is pneumatically actuated by means of a piston arrangement 145. Pressurized air is allowed to enter a fixed cylinder 146a to which a shaft 146b is securely attached. The regulating member 144 is securely attached to a piston 146c being slidably mounted onto the shaft 146b. When pressurized air is provided in the cylinder 146a the piston 146c and the regulating member 144 will be urged in a linear direction away from the cylinder 146a. This position will further be explained with reference to FIG. 4.

The flow control valve 130 forms part of a bypass channel 134 providing fluid communication between the outlet of the first turbine device 110 and the outlet of the second turbine device 120. A wall 132 surrounds the exhaust gas duct 143 such that a bypass channel 134 is formed between the wall 132 and the exhaust gas duct 143. A moving member 132b is provided in the form of a cylindrical body, and it is arranged adjacent to a port 133 and being slidable in a linear direction, i.e. towards and away from the second turbine device 120. The moving member 132b can thus be actuated such that it is arranged in the position shown in FIG. 3, in which the moving member 132b is closing the port 133; no exhaust gas is thereby allowed to bypass the second turbine device 120.

In another embodiment the moving member 132b is integrally formed with the wall 132 such that the wall 132 thus extends from the outlet of the first turbine device 110 and ends at a port 133 which connects the bypass channel 134, i.e. the channel formed between the wall 132 and the exhaust gas duct 143, to the outlet of the second turbine device 120. The moving member 132b, either actuated individually or as integrally formed with the wall 132, may be controlled by any known means such as hydraulically, pneumatically, mechanically, electrically, etc. Hence, such actuation will not be described in further detail. In case of pneumatic actuation it will be advantageous to construct the moving member 132b such that it will not be affected by pressure impulses of the exhaust gas flowing through the turbine system 100; the moving member 132b, moveable only in the direction of the exhaust gas flow, being such example.

In a yet further embodiment the port 133 may always be open, and flow control is achieved by a moving member (not shown) arranged at the end of the gas duct 143, i.e. the end facing the first turbine device 110. The moving member will in such embodiment open and close a channel between the gas duct 143 and the wall 132.

In another embodiment the flow control valve 130 is realized by actuation and linear movement of the exhaust gas duct 143 such that the exhaust gas duct 143 may seal against the inner surface of the wall 132.

FIG. 3 shows the port 133 to be annular; other embodiment are possible for which the port 133 only occupies a part of the periphery of the outlet of the second turbine device 120.

As can be seen in FIG. 4 the pneumatic on/off valve 140 has been actuated to substantially close the exhaust gas flow through the path 142. This means that the valve 140 is arranged in the closed position. The exhaust gas flow is thereby forced to flow through the bypass channel 134. Depending on the position of the moving member 132b, or wall 132 in case these are formed as a unit, a certain amount of exhaust gas may be allowed to flow through the port 133. The moving member 132b may thus provide continuously variable control of the exhaust gas flow from 100% closed to 100% bypass.

As already mentioned actuation of the valve 130 may be implemented in various known ways, e.g. hydraulically, pneumatically, electrically, or mechanically, as long as continuous variable control is enabled.

Figure 5:
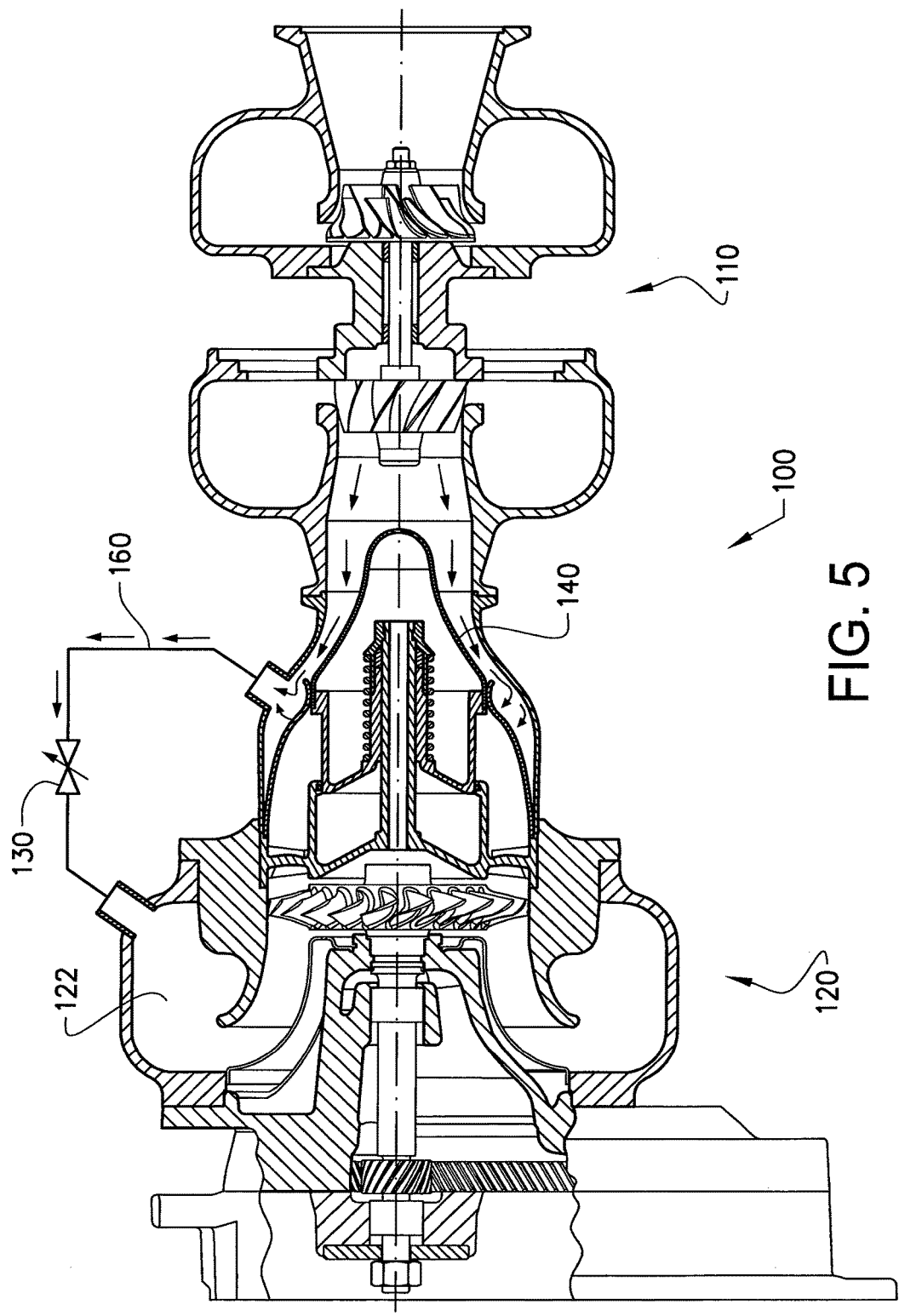
FIG. 5 is a cross-sectional view of a turbine system according to an embodiment.

FIG. 5 shows a further embodiment of a turbine system 100, for which the pneumatic on/off valve 140 is identical with the embodiment shown in FIGS. 3 and 4. However, the flow control valve 130 is arranged in connection with a bypass pipe 160 that extends from the outlet of the first turbine device 110 to the outlet of the second turbine device 120. The bypass pipe 160 is thus provided as a separate pipe being connecting at a specific position of the periphery of the outlet of the first turbine device 110, and at a specific position of the periphery of the outlet of the second turbine device 120. These two connecting positions may not necessarily aligned angularly; instead the pipe 160 may have a helical extension. Two or more pipes 160 may also be envisaged.

The valve 130 is configured to be operated in an open position, a closed position, and at least one intermediate position between the open position and the closed position. The valve 130 may be implemented as any known valve suitable for this purpose and configured to withstand the high temperatures of the exhaust gas flowing through, e.g. by means of a butterfly valve, a gate valve, etc. The valve 130 may be actuated by any known means, such as hydraulically, pneumatically, mechanically, electrically, etc.

As already has been described the turbine system 100 according to the above mentioned embodiments comprises a bypass valve 130 and an on/off valve 140. The on/off valve 140 is preferably a pneumatic valve which thereby provides a very efficient and reliable operation of the on/off valve 140 for shutting off the flow of exhaust gas to the second turbine device 120. The bypass valve, being a flow control valve configured to be variably controlled, may be realized in many different ways as long as it allows a predetermined amount of exhaust gas to flow from the outlet of the first turbine device 110 to the outlet of the second turbine device 120. Further to this, the bypass valve 140 is configured to close such that a back pressure may be provided.

For controlling the operation of the turbine system 100 a controller 150 is provided. The controller 150 is operating as a control unit configured to perform various operations, and it may have an input for receiving a signal representing the operational status of the turbine system 100, a determination unit being configured to determine a desired operational status of the turbine system 100 and to calculate a corresponding control signal, and two outputs for transmitting the control signal to the on/off valve 140 and to the flow control valve 130.

As already have been described the signal representing the operational status of the turbine system 100 may e.g. be a signal representing initiated braking, and the determination unit may consequently determine a desired bypass of a turbocompound unit 120. The on/off valve may thus be controlled to be closed, and the flow control valve 130 may open for allowing full bypass.

Now turning to FIG. 6 a method for controlling a turbine system will be described. The turbine system 100 is configured to recover energy of exhaust gases of an internal combustion engine and the turbine system 100 comprises a first turbine device 110, a second turbine device 120, a flow control valve 130 for bypassing the second turbine device 120, and a pneumatic valve 140 arranged between the first turbine device 110 and the second turbine device 120 in accordance with the description above. The method 200 comprises a first step 202 of determining if the on/off valve, preferably implemented as a pneumatic valve, should be in a fully open position or in a closed position. Performing the first step 202 results in a desired position of the on/off valve. The method also performs a step 204 of controlling the position of the on/off valve in accordance with its desired position, as well as a step 206 of determining if the flow control valve should be in a fully open position, a semi-open position, or in a closed position resulting in a desired position of the flow control valve. The method 200 further performs the step 208 of controlling the position of the flow control valve in accordance with its desired position. Preferably, the step 204 is performed by arranging the on/off valve in one of two possible end positions; a fully open position corresponds to a first end position, and a closed position corresponds to an opposite end position.

It is to be understood that the present invention is not limited to the embodiments described above and illustrated in the drawings; rather, the skilled person will recognize that many changes and modifications may be made within the scope of the appended claims.

The invention claimed is:

1. A turbine system for recovering energy of exhaust gases of an internal combustion engine, comprising a first turbine device, a second turbine device, and an exhaust gas, pressure regulator forming part of a diffuser for the exhaust gas flowing through the turbine system, the exhaust gas pressure regulator is arranged between the first turbine device and the second turbine device and configured to control the flow of exhaust gas to the second turbine device, wherein the second turbine device is a turbocompound device arranged in series with the first turbine device, wherein the exhaust gas pressure regulator is an on/off valve, and the turbine system further comprises a flow control valve, which is configured to be positioned in at least one intermediate position between a fully opened and a closed position, in order that exhaust gases bypass the second turbine device.

2. The turbine, system according to claim 1, further comprising a controller being connected to the flow control valve and to the on/off valve for regulating the valves.

3. The turbine system according to claim 2, wherein the controller is configured to regulate the on/off valve in either a fully open position or in a closed position.

4. The turbine system according to claim 1, wherein the flow control valve is continuously variable between two end positions.

5. The turbine system according to claim 1, wherein the flow, control valve comprises a moving member which in a first end position is closing a bypass channel formed by the moving member, and which in a second end position is opening the bypass channel.

6. The turbine system according to claim 5, wherein the moving member is configured to move in a linear direction.

7. The turbine system according to claim 6, wherein the moving member forms part of a sliding wall.

8. The turbine, system according to claim 7, wherein the sliding wall surrounds the on/off valve such that the bypass channel forms an annular channel radially outside the on/off valve.

9. The turbine system according to claim 4, wherein the bypass channel extends from an outlet of the first turbine device to an outlet of the second turbine device.

10. The turbine system according to claim 1, further comprising at least one bypass pipe, and wherein the flow control valve is arranged inside the bypass pipe for regulating the flow through the bypass pipe.

11. The turbine system according to claim 10, wherein the bypass pipe extends from an outlet of the first turbine device to an outlet of the second turbine device.

12. The turbine system according to claim 1, wherein the first turbine device is a turbocharger device.

13. A vehicle comprising a turbine system according to claim 1.

14. A method for controlling a turbine system configured to recover energy of exhaust gases of an internal combustion engine, the turbine system comprising a first turbine device, a second turbine device, a flow control valve for bypassing the second turbine device, and a pneumatic on/off valve in the form of an exhaust gas pressure regulator forming part of a diffuser for the exhaust gas flowing through the turbine system, the exhaust gas pressure regulator is arranged between the first turbine device and the second turbine device, wherein the second turbine device is a turbocompound device arranged in series with the first turbine device, comprising:
determining if the pneumatic valve should be in a fully open position or in a closed position resulting in a desired position of the pneumatic valve,
controlling the position of the pneumatic valve in accordance with its desired position;
determining if the flow control valve should be in a fully open position, a semi-open position, or in a closed position resulting in a desired position of the flow control valve, and
controlling the position of the flow control valve in accordance with its desired position.

15. The method according to claim 14, wherein the step of controlling the position of the pneumatic valve according to a folly open position comprises arranging the pneumatic valve in an end position, and wherein the step of controlling the position of the pneumatic valve according to a closed position comprises arranging the pneumatic valve in an opposite end position.

16. A computer comprising a program for performing the steps of claim 14 when the program is run on the computer.

17. A non-transitory computer readable medium carrying a computer program for performing the steps of claim 14 when the program product is run on a computer.

18. A control unit for controlling the operation of a turbine system, the control unit being configured to perform the steps of the method according to claim 14.

* * * * *